United States Patent
O'Riordan et al.

(10) Patent No.: US 8,784,924 B2
(45) Date of Patent: Jul. 22, 2014

(54) HEAT-EXPANDED FOOD PRODUCTS

(75) Inventors: Dolores O'Riordan, Dublin (IE); Michael O'Sullivan, Slane (IE); James Lyng, Dublin (IE); Elaine Duggan, Dublin (IE)

(73) Assignee: University of College Dublin, National University of Ireland, Dublin, Dublin (IE)

( * ) Notice: Subject to any disclaimer, the term of this patent is extended or adjusted under 35 U.S.C. 154(b) by 52 days.

(21) Appl. No.: 12/740,875

(22) PCT Filed: Oct. 31, 2008

(86) PCT No.: PCT/EP2008/009203
§ 371 (c)(1),
(2), (4) Date: Apr. 30, 2010

(87) PCT Pub. No.: WO2009/056331
PCT Pub. Date: May 7, 2009

(65) Prior Publication Data
US 2010/0266735 A1    Oct. 21, 2010

(30) Foreign Application Priority Data
Oct. 31, 2007   (IE) .................... S2007/0793

(51) Int. Cl.
*A23C 19/00* (2006.01)
*A23C 9/154* (2006.01)
*A23J 7/00* (2006.01)
*A23B 4/03* (2006.01)
*A23L 1/164* (2006.01)

(52) U.S. Cl.
USPC ........... 426/582; 426/580; 426/661; 426/445; 426/241

(58) Field of Classification Search
None
See application file for complete search history.

(56) References Cited

U.S. PATENT DOCUMENTS

| 3,741,774 | A | * | 6/1973 | Burkwall | ........... 426/582 |
| 4,719,118 | A | | 1/1988 | Thomas | |
| 4,803,090 | A | * | 2/1989 | Schlipalius et al. | ........... 426/242 |
| 5,932,276 | A | * | 8/1999 | Bhatia et al. | ........... 426/614 |
| 2006/0083842 | A1 | | 4/2006 | Miller | |
| 2006/0286286 | A1 | * | 12/2006 | Holzer et al. | ........... 426/661 |
| 2007/0219160 | A1 | * | 9/2007 | Okoniewska et al. | ........... 514/60 |

FOREIGN PATENT DOCUMENTS

| EP | 1 300 083 A1 | 4/2003 |
| EP | 1 438 902 A1 | 7/2004 |
| GB | 1312910 | 4/1973 |
| JP | 03147752 A * | 6/1991 |
| WO | WO 2006044461 A1 * | 4/2006 |
| WO | 2007/122260 A1 | 11/2007 |

OTHER PUBLICATIONS

Glenn, Gregory M.; Klamczynski, Artur, K.; Holtman, Kevin, M.; Shey, Justin; Chiou, Bor-Sen; Berrois, Jose; Wood, Delilah,; Orts, William, J; and Imam, Syed, H. Heat Expanded Starch-Based Compositions. J. Agricultural and Food Chemistry, 2007, 55: 3936-3943.*
Clara Montesinos-Herrero, David C. Cottell, E. Dolores O'Riordan, Michael O'Sullivan Partial replacement of fat by functional fibre in imitation cheese: Effects on rheology and microstructure.International Dairy Journal 16 (Aug. 2006) 910-919.*
Arimi, J.M., et al. "Microwave expansion of imitation cheese containing resistant starch." 2008. Journal of Food Engineering. vol. 88, pp. 254-262. Elsevier Ltd.
Arimi, J.M., et al. "Effect of refrigerated storage on water mobility and microwave expansion of imitation cheese containing resistant starch." 2008. Journal of Food Engineering. vol. 89, pp. 258-266. Elsevier Ltd.

* cited by examiner

*Primary Examiner* — Humera Sheikh
*Assistant Examiner* — Subbalakshmi Prakash
(74) *Attorney, Agent, or Firm* — Nath, Goldberg & Meyer; Tanya E. Harkins

(57) ABSTRACT

This invention relates to heat-expanded synthetic cheese products, heat-expandable precursors for forming same, the preparation of the precursor and the cheese products, and the use of a sugar alcohol for improving the organoleptic properties and/or the volume expansion % of the heat-expandable precursors and/or heat-expanded synthetic cheese products. The invention provides a heat-expanded synthetic cheese product, comprising:—from about 20% to about 59% by weight of a milk protein or a source thereof; from about 10% to about 50% by weight of a starch; from about 2% to about 24% by weight of a sugar alcohol; from about 3% to about 15% by weight of water; wherein the heat-expanded synthetic cheese product comprises no more than 10% by weight of fat, the percentages being percentages by weight of the total product, and wherein the heat-expanded synthetic cheese product is a microwave-expanded synthetic cheese product or a radiofrequency (RP)-expanded synthetic cheese product.

36 Claims, No Drawings

HEAT-EXPANDED FOOD PRODUCTS

This is a National Phase Application filed under 35 U.S.C. §371 as a national stage of PCT/EP2008/009203, filed on Oct. 31, 2008, claiming the benefit of Irish Patent Application S2007/0793, filed on Oct. 31, 2007, the content of each of which is hereby incorporated by reference in its entirety.

This invention relates to heat-expanded food products, especially heat-expanded synthetic cheese products, and heat-expandable precursors for forming same. In particular, this invention relates to microwave-expanded synthetic cheese products, and microwave-expandable precursors for forming same.

Microwave-expandable snack foods have received increased attention in recent years because of their convenience and their diverse shapes and textures that can be obtained both commercially and in the home, using a pre-made food formulation.

Microwave-expanded puffed snack food products based on synthetic or imitation cheese product precursors are known. However, many microwave-expandable products do not have optimum crispiness once expanded, and tend to have a soggy, undesirable texture. The volume expansion % of these cheese precursors tends to be very low which is not appealing to consumers. Another disadvantage is that the cheese precursors are typically doughs having poor taste and texture, and are not suitable for consumption.

Snack food products which are expanded by heat-extrusion rather than by microwave heating are also known. Similar to the microwave-expandable precursors discussed above, heat-extrudable precursors tend to be in the form of dough not suitable for consumption. A further disadvantage is that heat-extrudable products are not in a convenient ready-to-heat form, since the precursors need to be heat-extruded to expand, and they can only be sold post-extrusion. This is not convenient to consumers who wish to heat and expand their snack food as required.

Although there is much variation in the composition of synthetic cheeses, a typical cheese precursor composition includes water, protein, and approximately 25% fat, and a typical microwave-expanded cheese composition includes about 40% fat, of which approximately 40-70% is generally saturated fat. Because of their high saturated fat content, such food products are quite unhealthy. It is becoming increasingly desirable to produce low fat products, since low fat products are healthier than high fat products, but also tend to taste better than products containing no fat at all. However, conventional microwave-expandable snack food products which are low in fat have disadvantages, as they typically have particularly poor volume expansion upon heating. For example, WO 2007/122260 describes heat-expanded food products including low fat heat-expanded food products comprising less than 10% fat. However, these low fat heat-expanded products were shown to exhibit quite poor volume expansion, and had less than optimum crispiness and texture.

It is therefore an object of the present invention to mitigate the disadvantages associated with prior art synthetic cheese precursors and microwave-expanded food products made from same.

It is also an object of the invention to provide a heat-expanded food product which is a crispy, puffed synthetic cheese product and which has good organoleptic properties, is satisfying, high in protein and fibre but also low in fat, and has good volume expansion, and therefore provides improved taste and texture and a healthier alternative to microwave-expanded synthetic cheese products currently available.

It is a further object of the invention to provide an edible heat-expandable precursor for forming the synthetic cheese product of the invention, which precursor has a high protein and fibre content but is also low in fat and is capable of achieving a good volume expansion % on heating to form the heat-expanded synthetic cheese product of the invention, and has good taste and texture.

It has now surprisingly been found that the presence of a sugar alcohol provides heat-expanded synthetic cheese products which are high in fibre and low in fat, and have excellent volume expansion on heating in a microwave oven or in a radiofrequency (RF) oven.

According to a first aspect of the present invention, there is provided a heat-expanded synthetic cheese product, comprising:— from about 20% to about 59% by weight of a milk protein or a source thereof;
from about 10% to about 50% by weight of a starch;
from about 2% to about 24% by weight of a sugar alcohol;
from about 3% to about 15% by weight of water;
wherein the heat-expanded synthetic cheese product comprises no more than 10% by weight of fat,
the percentages being percentages by weight of the total product,
and wherein the heat-expanded synthetic cheese product is a microwave-expanded synthetic cheese product or a radiofrequency (RF)-expanded synthetic cheese product.

Suitable milk proteins and sources thereof include casein, total milk proteins, milk protein concentrates or isolates, skim milk curd and other casein whey combinations. Casein may be present in a soluble and/or insoluble form, such as acid casein, rennet casein, skim milk curd and soluble caseinate derivatives such as sodium caseinate, calcium caseinate and potassium caseinate. A preferred milk protein is rennet casein. The milk protein may be included as a source thereof. The milk protein or source thereof is preferably present in an amount of from about 25% to about 55%, preferably from about 30% to about 50%, more preferably from about 35% to about 45%, more preferably from about 36% to about 43%, still more preferably from about 37% to about 42%, most preferably from about 38% to about 40% by weight of the heat-expanded synthetic cheese product.

The starch may be derived from any suitable source such as cereals especially corn and maize, or rice, or a combination thereof. Starch derived from tubers such as potato or root crops may also be used. Suitable starches include starches which are either granular or non-granular native starches, modified or unmodified. Modified starches include gelatinised, cross-linked and substituted starches. The starch is preferably in a native granular form, wherein the granule size will vary with the origin/type of the starch. A high amylose starch is preferred. The starch is conveniently a resistant starch. As used herein, the term "resistant starch" is intended to mean starch that escapes or substantially escapes digestion by enzymatic hydrolysis in the small intestine, but can be fermented in the large intestine by microflora. In this way, resistant starch is considered to be a form of dietary fibre. Resistant starches may have prebiotic properties.

The starch used preferably has a gelatinisation temperature of greater than 70° C., more preferably greater than 80° C.

Corn starch is particularly preferred, especially corn starch sold under the trade name Hi Maize (previously sold under the trade name Novelose), obtainable from National Starch and Chemicals, Manchester, England such as Hi Maize 260.

The starch is preferably present in an amount of from about 12% to about 45%, more preferably from about 13% to about 40% by weight, even more preferably from about 13% to about 33% by weight of the synthetic cheese product.

Suitable sugar alcohols include, however are not limited to, sorbitol, xylitol, mannitol and glycerol or any combination thereof, preferably sorbitol, xylitol or glycerol or any combination thereof. The sugar alcohol is preferably present in an amount of from about 3% to about 22%, preferably from about 4% to about 20%, more preferably from about 4% to about 18%, even more preferably from about 4% to about 17%, even more preferably from about 4% to about 16%, even more preferably from about 4% to about 15%, even more preferably from about 4% to about 13%, even more preferably from about 5% to 13%, even more preferably about 6% or 7% or 8% or 9% or 10% or 11% or 12% by weight of the heat-expanded synthetic cheese product. Sorbitol, xylitol or glycerol, or any combination thereof, present in an amount of from about 5% to about 13%, by weight of the heat-expanded synthetic cheese product, is especially preferred.

The heat-expanded synthetic cheese product of the invention preferably comprises water in an amount of from about 5% to about 13%, more preferably from about 6% to about 12%, most preferably from about 7% to about 11% by weight of the heat-expanded synthetic cheese product.

In the heat-expanded synthetic cheese product of the invention, the fat is preferably present in an amount of from about 1% to about 9%, more preferably no more than 8% or 7% or 6% or 5% or 4% or 3% or 2% or 1% by weight of the product. In an embodiment, the heat-expanded synthetic cheese product comprises no added fat or substantially no added fat. In a particularly preferred embodiment, fat is present in an amount of approximately 7-9% by weight of the product. When the fat is present, the fat used may be selected from one or more of the following: edible marine oils and fats, edible animal oils and fats, and edible vegetable oils and fats, optionally modified by fractionation and/or hydrogenation and/or inter-esterification. Suitable oils and fats include palm oil, rapeseed oil, soy bean oil, palm kernel oil, sunflower oil, coconut oil, cotton seed oil, canola oil and safflower oil, tallow, lard, fish and mixtures thereof. Rapeseed oil is particularly preferred. Rapeseed oil present in an amount of approximately 7-9% by weight of the product is especially preferred.

The heat-expanded synthetic cheese product of the invention may also include one or more conventional additives. Suitable additives include emulsifying agents, acidity regulators, preservatives, flavouring agents, colouring agents, and the like.

The heat-expanded synthetic cheese product of the invention preferably has a hardness value of from about 5 N to about 22 N, more preferably from about 7 N to about 15 N, even more preferably from about 8 N to about 13 N, as measured using a universal testing machine (Model No. 5544, Instron Corporation, High Wycombe, UK), fitted with a 500 N load cell and a 5 mm diameter cylindrical flat-faced probe.

The heat-expanded synthetic cheese product of the invention preferably has a volume expansion % of from about 150% to about 600%, more preferably from about 200% to about 500%, most preferably from about 250% to about 400%.

As used herein, the term "microwave" is intended to mean electromagnetic radiation having a frequency of from about 300 MHz to about 300 GHz. As used herein, the term "radiofrequency" is intended to mean electromagnetic radiation having a frequency of from about 3 Hz to about 300 MHz. The terms "microwave-expanded" and "microwave-expandable" mean expanded or expandable respectively on exposure to microwave radiation (about 300 MHz to about 300 GHz), and the terms "radiofrequency (RF)-expanded" and "radiofrequency (RF)-expandable" mean expanded or expandable respectively on exposure to radiofrequency (RF) radiation (about 3 Hz to about 300 MHz). As used herein, the term "heat-expanded" or "heat-expandable" is intended to exclude heating using a conventional oven.

According to a second aspect of the present invention, there is provided an edible heat-expandable precursor for forming the heat-expanded synthetic cheese product according to the invention, the heat-expandable precursor comprising:—
 from about 12% to about 26% by weight of a milk protein or a source thereof;
 from about 3% to about 30% by weight of a starch;
 from about 1% to about 10% by weight of a sugar alcohol;
 from about 46% to about 60% by weight of water;
wherein the precursor comprises no more than 6% by weight of fat,
the percentages being percentages by weight of the precursor,
and wherein the edible heat-expandable precursor is a microwave-expandable precursor or a radiofrequency (RF)-expandable precursor.

The milk protein as defined above for the heat-expanded synthetic cheese product is preferably present in the precursor in an amount of from about 15% to about 25%, more preferably from about 17% to about 25%, most preferably from about 19% to about 25%, especially from about 24% to about 25% by weight of the precursor.

The starch as defined above for the heat-expanded synthetic cheese product is preferably present in the precursor in an amount of from about 5% to about 25%, more preferably from about 6% to about 20%, even more preferably from about 7% to about 17% by weight of the precursor.

The sugar alcohol is as defined above for the heat-expanded synthetic cheese product and is preferably present in the precursor in an amount of from about 2% to about 9%, more preferably from about 2% to about 8%, even more preferably from about 2% to about 7%, still more preferably from about 2% to about 6%, even more preferably from about 3% to about 6%, even more preferably about 3.5% or 4% or 4.5% or 5% or 5.5%, by weight of the precursor.

The heat-expandable precursor of the invention preferably comprises water in an amount of from about 48% to about 55%, especially approximately 50% by weight of the precursor.

In the heat-expandable precursor of the invention, the fat is as defined above for the heat-expanded synthetic cheese product and is preferably present in an amount of no more than 5% or 4% or 3% or 2% or 1% or 0.5% or 0.4% or 0.3% or 0.2% or 0.1% by weight of the precursor. In an embodiment, the precursor comprises no added fat or substantially no added fat. In a particularly preferred embodiment, the precursor comprises fat in an amount of approximately 3.5%-4.5% by weight of the precursor.

The precursor may also include one or more conventional additives. Suitable additives include emulsifying agents, acidity regulators, preservatives, flavouring agents, colouring agents, and the like.

As used herein, the term "emulsifying agent" is intended to mean a substance capable of converting protein into a dispersed form, thereby bringing about homogeneous distribution of components within the heat-expandable precursor. Thus, an emulsifying agent is necessary when an insoluble protein such as rennet casein or acid casein is used in the heat-expandable precursor of the invention.

When an emulsifying agent is present, it is preferably in the form of a salt or a combination of salts. The emulsifying agent is preferably a calcium chelating salt, preferably a sodium or a potassium salt. Suitable calcium chelating salts include salts of phosphoric acids (which may be ortho or polyphosphates) and citric acid; including but not limited to, monosodium phosphate, monopotassium phosphate, monosodium citrate, monopotassium citrate, disodium phosphate, dipotassium phosphate, disodium citrate, dipotassium citrate, trisodium phosphate, tripotassium phosphate, trisodium citrate, tripotassium citrate, tetrasodium phosphate, tetrapotassium phosphate, tetrasodium citrate; sodium polyphosphates, potassium polyphosphates, sodium calcium polyphosphate, calcium polyphosphates; and sodium aluminium phosphate; and combinations thereof. A combination of a sodium citrate and a sodium phosphate is preferred, in particular, a combination of trisodium citrate and disodium phosphate.

The amount of the emulsifying agent present in the heat-expandable precursor of the invention will vary with the amount of insoluble casein present in the precursor. A preferred ratio of emulsifying agent to insoluble casein is in the range of from about 0.05 to about 0.08, more preferably approximately 0.063, based on the weight % of each component.

In a particularly preferred embodiment, the heat-expandable precursor cheese product includes from about 0.5% to about 2%, more preferably from about 1.0% to about 1.5%, still more preferably, approximately 1.27% by weight of emulsifying agent based on the precursor. Most preferably, the heat-expandable precursor comprises a combination of approximately 0.87% trisodium citrate and approximately 0.4% disodium phosphate by weight of the heat-expandable precursor. A ratio of approximately 2:1 trisodium citrate to disodium phosphate is particularly preferred.

When an acidity regulator is present, it is preferably present in an amount of from about 0.1% to about 1% by weight of the precursor. Suitable acidity regulators include lactic acid, adipic acid and citric acid. A preferred acidity regulator is citric acid. Citric acid present in an amount of approximately 0.5% by weight of the precursor is particularly preferred.

When a preservative is present, it is preferably present in an amount of from about 0.01% to about 0.5% of the precursor. A preferred preservative is sorbic acid. Sorbic acid present in an amount of approximately 0.08% by weight of the precursor is particularly preferred.

When a flavouring agent is present, it is preferably present in an amount of from 0.5% to about 2.5% by weight of the precursor. The flavouring agent may comprise one or more flavouring agents. A preferred flavouring agent is sodium chloride. Sodium chloride present in an amount of approximately 1.37% by weight of the precursor is particularly preferred. It will be appreciated that any other flavouring agents desired to impart a particular flavour to the heat-expandable precursor, may be used.

The edible heat-expandable precursor of the invention is preferably capable of achieving a volume expansion % of from about 150% to about 600%, more preferably from about 200% to about 500%, most preferably from about 250% to about 400%.

According to a third aspect of the present invention, there is provided the use of a sugar alcohol for improving the organoleptic properties and/or the volume expansion % of a heat-expandable precursor and/or a heat-expanded synthetic cheese product according to the invention.

Preferably, the sugar alcohol is selected from sorbitol, xylitol, mannitol and glycerol or any combination thereof, more preferably sorbitol, xylitol or glycerol or any combination thereof.

Improving the organoleptic properties of a heat-expandable precursor according to the invention includes, for example, improving the texture of the precursor by improving the smoothness, reducing graininess, thereby making the precursor more palatable as an edible product.

Improving the organoleptic properties of a heat-expanded synthetic cheese product according to the invention includes, for example, improving the texture of the cheese product by improving the crispiness and reducing undesirable sogginess or brittleness.

The heat-expandable precursor according to the invention may be prepared by a method comprising the steps of:
  (a) combining the milk protein, water and fat, when present, at a temperature of from about 30° C. to about 90° C.; and
  (b) adding the starch and the sugar alcohol to the resulting mixture.

Preferably, step (a) comprises combining the ingredients at a temperature of from about 30° C. to about 70° C., followed by heating the combined ingredients to a temperature of from about 70° C. to about 90° C.

Preferably, following step (b), the heat-expandable precursor is allowed to cool to a temperature of from about 1° C. to about 6° C., more preferably about 4° C.

The heat-expanded synthetic cheese product according to the invention may be prepared by a method comprising the above steps (a) and (b) and a further step of:
  (c) subjecting the heat-expandable precursor according to the invention to microwave or radiofrequency (RF) heat until the heat-expandable precursor has expanded.

Optionally, before heating in step (c), the precursor is allowed to rest for a period of from about 12 hours to about 14 days, preferably from about 24 hours to about 7 days, most preferably for about 24 hours, preferably at a temperature of from about 1° C. to about 6° C., more preferably at about 4° C.

Preferably, the precursor is heated by microwave or RF heat until the precursor achieves a volume expansion % of from about 100% to about 700%, more preferably from about 150% to about 650%, even more preferably from about 150% to about 600%, even more preferably from about 200% to about 500%, most preferably from about 250% to about 400%. A volume expansion % of about 250% to about 400% is preferred, as it provides the best texture in terms of crispiness. A volume expansion % of up to 650% for a product containing no fat can be achieved. The cheeses can conveniently be stored at −20° C. and microwaved from a frozen state.

Preferably, the precursor is subjected to the microwave or RF treatment for a period of from about 10 to 100 seconds in a microwave set at 500-1500 W, more preferably for a period of about 60 seconds in a microwave set at 1000 W.

As used herein, the term "volume expansion %" is generally intended to mean the degree of volume expansion calculated as follows:

$$\text{Volume expansion \%} = \frac{\text{final volume} - \text{initial volume}}{\text{initial volume}} \times 100\%$$

where the initial and the final volumes correspond to the respective volumes of (a) the heat-expandable precursor measured before heating in a microwave oven or a radiofrequency (RF) oven; and (b) the heat-expanded synthetic cheese product after heating in a microwave oven or a radiofrequency (RF) oven. Volume is measured by a displacement method using millet seeds. The volume expansion % measurements are in accordance with the American Association of Cereal Chemists, 2000, Approved Methods of the AACC, 10$^{th}$ edition.

Thus, a volume expansion % of 100% implies that the final volume is twice that of the initial volume. A volume expansion % of 500% would mean that the final volume was six times the initial volume.

Advantages of the products of the invention include the following:

The heat-expanded synthetic cheese products have excellent organoleptic properties compared with prior art cheese products. For example, they have good taste and improved texture, having good crispiness and without the sogginess or brittleness normally associated with such cheese products.

The heat-expanded synthetic cheese products of the invention provide tasty food products which also have nutritional benefits. For example, the heat-expanded products have a fat content of less than 10%. This is in contrast to conventional heat-expanded synthetic cheese products which have a higher fat content of about 40% fat.

Additionally, the starch in the products of the invention provides the products with the advantage of having high fibre content. This is in contrast to conventional heat-expanded synthetic cheese products which have a very low fibre content. Starch is typically only added to conventional synthetic cheese products as a replacement for the protein, in order to reduce the cost of preparation.

A further advantage of the heat-expanded synthetic cheese products of the invention is that they may be sold in a heat-expandable precursor form ready for heating by the consumer, with the result that the consumer may choose when to heat the product in order to produce a ready-to-eat crispy puffed food product. This heat-expandable precursor may be sold in a chilled or frozen form. The heat-expandable cheese precursor may be eaten before being heated, if desired, to provide a tasty and satisfying food product. This is in contrast to precursors of known heat-expandable food products, which are not suitable for consumption. The products may also be sold in a heat-expanded form that is conveniently packaged ready to eat. The ready-to-eat heat-expanded puffed crispy synthetic cheese products are low in fat, low in sugar, high in fibre, and provide most or all of the nutritional benefits and taste of cheese.

An advantage of the precursors of the invention is that they have a volume expansion % far superior to known synthetic cheeses upon heating. It has now surprisingly been found that the use of a sugar alcohol enables the precursors of the invention to achieve a volume expansion % of up to 650% on heating.

The following examples serve to illustrate the invention but it will be appreciated that the invention is not limited to these examples.

EXAMPLE 1 (COMPARATIVE) AND EXAMPLES 2-7

Heat-expandable precursors according to the invention were prepared from the ingredients listed in Table 1:

TABLE 1

| INGREDIENTS | Ex. 1 (Comparative) | Ex. 2 | Ex. 3 | Ex. 4 | Ex. 5 | Ex. 6 | Ex. 7 |
| --- | --- | --- | --- | --- | --- | --- | --- |
| Rennet casein[1] (80% protein) | 24.42% | 24.42% | 24.42% | 24.42% | 24.42% | 24.42% | 24.42% |
| Hi-Maize 260[2] (Trade Mark) | 17.35% | 15.35% | 14.35% | 13.35% | 11.35% | 7.35% | 15.35% |
| Sorbitol | 0% | 2% | 3% | 4% | 6% | 10% | 6% |
| Rapeseed oil | 4% | 4% | 4% | 4% | 4% | 4% | 0% |
| Trisodium citrate[3] | 0.87% | 0.87% | 0.87% | 0.87% | 0.87% | 0.87% | 0.87% |
| Disodium phosphate[3] | 0.4% | 0.4% | 0.4% | 0.4% | 0.4% | 0.4% | 0.4% |
| Water | 51.0% | 51.0% | 51.0% | 51.0% | 51.0% | 51.0% | 51.0% |
| Citric acid[4] | 0.5% | 0.5% | 0.5% | 0.5% | 0.5% | 0.5% | 0.5% |
| Sorbic acid[5] | 0.08% | 0.08% | 0.08% | 0.08% | 0.08% | 0.08% | 0.08% |
| Sodium Chloride[6] | 1.37% | 1.37% | 1.37% | 1.37% | 1.37% | 1.37% | 1.37% |

[1]Kerry Ingredients, Listowel, Ireland;
[2]National Starch and Chemicals, Manchester, England;
[3]Ellis and Everard, Dublin, Ireland;
[4]Jungbunzlauer, Pernhofen, Austria;
[5]Hoechst Ireland Limited, Dublin, Ireland;
[6]Salt Union, Cheshire, England.

A heat-expandable precursor according to example 2 was prepared as follows:

(A) All of the ingredients listed in Table 1 except citric acid, sorbitol and Hi-Maize 260 (Trade Mark) were added to and mixed in a twin-screw cooker (model CC-010, Blentech Corporation, CA, USA). A temperature of 50° C. was maintained during the mixing by injecting steam into the steam jacket of the cooker. The mixture was then heated to 80° C. by direct injection of steam into the contents; this temperature was reached after approximately 3 minutes. The Hi-Maize 260 (Trade Mark) and sorbitol were added and the temperature was maintained at 80° C. (using the steam jacket) for approximately 1 minute, or until a uniform mass was obtained. Citric acid was then added and mixed for a further 1 minute. The mixture was then removed from the cooker and cooled to 4° C.

(B) The cooled heat-expandable precursor was cut using a cork borer into cylindrical sample pieces of approximately 2 g weight, approximately 15 mm diameter and approximately 5 mm height. The sample pieces were wrapped in aluminium foil to minimize moisture loss and stored at a temperature of approximately 5° C. in a refrigerator for 24 hours (1 day).

Heat-expandable precursors according to examples 3, 4, 5 and 6 were prepared according to the above procedure but including 3% by weight of a sugar alcohol, sorbitol (example 3), 4% by weight of sorbitol (example 4), 6% by weight of sorbitol (example 5) and 10% by weight of sorbitol (example 6). In example 7, a heat-expandable precursor of the invention was prepared using 6% of sorbitol and no fat. In these examples, the sorbitol was added in direct replacement (on a weight % basis) of Hi-Maize 260 (Trade Mark) used to produce the heat-expandable precursor of example 2, except in example 7, in which the sorbitol was added in direct replacement (on a weight % basis) of Hi-Maize 260 (Trade Mark) and fat.

EXAMPLE 8

Microwave-expanded products according to the invention were prepared as follows:

Immediately prior to microwave heating of the heat-expandable precursor, the microwave was preheated, e.g. by heating one litre of water for three consecutive 10-minute periods. The purpose of preheating the microwave was to allow the products to be evenly heated so they could be analysed afterwards. It will be appreciated that it would not be necessary for a consumer to preheat the microwave prior to microwaving the precursor.

The sample pieces of precursor from examples 1-7 were removed from the refrigerator and the aluminium foil surrounding the sample pieces was removed. The sample pieces were placed individually on a piece of shrink film, to avoid the sample sticking to the plate. Each sample in turn was placed on a support about 0.5 cm above a microwavable glass plate, and was then heated for different periods of times (10-100 s) in a constant power microwave oven set at 1000 W, at a frequency of 2450±50 MHz (Commercial Armana RS591SS, Armana refrigeration, Inc, Armana Iowa, USA). The output of 1000 W was verified using the International Microwave Power Institute (IMPI) two-litre test. It will be appreciated that a commercial microwave having a frequency of e.g. 915±25 MHz or 896±25 MHz may alternatively be used. It will be appreciated that other electromagnetic heating ovens e.g. a radiofrequency (RF) oven, may also be used, to produce a radiofrequency-expanded synthetic cheese product. The microwave heating of the sample pieces produced the microwave-expanded synthetic cheese products of the invention. The cavity dimensions of the microwave were 39 cm×34 cm×27 cm (depth×width×height), although it will be appreciated that microwave cavities of different dimensions could be used. Microwave-expanded synthetic cheese products which were heated for 60 seconds in a microwave oven set at 1000 W were allowed to cool at room temperature, following which they were analysed for moisture content, fat content, protein content (and sorbitol and carbohydrate content) as set out in (i)-(iii) below:

(i) analysis for moisture by oven drying (IDF 1958) method;
(ii) analysis for fat by the Gerber method (National Standards Authority of Ireland, 1955); and
(iii) analysis for protein using the semi-micro Kjeldahl method (IDF, 1993).

The results are given in Table 2 below:

TABLE 2

| | Added Sorbitol (%) | Sorbitol Analysis (%) | Fat Content (%) | Moisture Content (%) | Protein Content (%) | Ash (%) | Carbohydrate (%) |
|---|---|---|---|---|---|---|---|
| Example 1 | 0 | 0 | 8.5 | 11.0 | 38.2 | 8.5 | 33.8 |
| Example 2 | 2 | 4.22 | 8.4 | 11.7 | 37.88 | 8.4 | 29.4 |
| Example 3 | 3 | 4.95 | 8.3 | 11.5 | 38.0 | 8.4 | 26.29 |
| Example 4 | 4 | 8.56 | 8.56 | 10.1 | 38.53 | 8.56 | 25.69 |
| Example 5 | 6 | 13.16 | 8.77 | 7.9 | 39.47 | 8.77 | 21.93 |
| Example 6 | 10 | 22.15 | 8.86 | 7.0 | 39.85 | 8.86 | 13.28 |
| Example 7 | 6 | 13.26 | 0 | 7.0 | 40.5 | 8.68 | 30.56 |

The microwave-expanded synthetic cheese products originating from example 1 (comparative example) and examples 2-7 were analysed for expansion, after resting for 1 day; 4 or 5 days; and 7 days. The degree of expansion (volume expansion %) of the synthetic cheese products was determined for each of the products using the formula given above, and the results are given in Table 3 below:

TABLE 3

| | Sorbitol added % | Expansion % day + 1 | Expansion % day + 4/5 | Expansion % day + 7 |
|---|---|---|---|---|
| Example 1 | 0 | 125.73 | 126.47 | 142.13 |
| Example 2 | 2 | 84.27 | 113.76 | 200.78 |
| Example 3 | 3 | 150 | 172 | 205 |
| Example 4 | 4 | 273.41 | 353.54 | 368.16 |
| Example 5 | 6 | 141.67 | 241.67 | 371.04 |
| Example 6 | 10 | 127.76 | 155.77 | 162.41 |
| Example 7 | 6 | 126 | 486 | 646 |

For each batch, 10 samples were measured, and the averages taken.

The hardness of the synthetic cheese products was determined for the products containing 0%, 2%, 4%, 6% and 10% sorbitol as follows.

The samples were punctured using a universal testing machine (Model No. 5544, Instron Corporation, High Wycombe, UK) fitted with a 500 N load cell and a 5 mm diameter cylindrical flat-faced probe, at a cross head speed of 60 mm min$^{-1}$. The probe was set to travel a distance of 40 mm to ensure it had completely punctured through the sample. The maximum force required to puncture the samples was obtained. The results, given as hardness values in Newtons (N), are shown in Table 3A below.

TABLE 3A

| | Sorbitol added % | Hardness (N) day + 1 | Hardness (N) day + 4 | Hardness (N) day + 7 |
|---|---|---|---|---|
| Example 1 | 0 | 41.51 ± 11.53 | 29.80 ± 7.67 | 14.91 ± 7.53 |
| Example 2 | 2 | 21.03 ± 8.45 | 20.03 ± 9.63 | 12.07 ± 2.44 |
| Example 4 | 4 | 12.92 ± 6.61 | 7.79 ± 2.98 | 6.96 ± 4.63 |
| Example 5 | 6 | 12.75 ± 5.09 | 8.72 ± 6.07 | 5.53 ± 2.99 |
| Example 6 | 10 | 9.65 ± 4.36 | 10.41 ± 4.01 | 9.67 ± 4.41 |

For each batch, 10 samples were measured, and the averages taken.

EXAMPLES 9-12

Heat-expandable precursors according to the invention were prepared from the ingredients listed in Table 4:

TABLE 4

| INGREDIENTS | Ex. 9 | Ex. 10 | Ex. 11 | Ex. 12 |
|---|---|---|---|---|
| Rennet casein[1] (80% protein) | 24.42% | 24.42% | 24.42% | 24.42% |
| Hi-Maize 260[2] (Trade Mark) | 15.35% | 13.35% | 11.35% | 9.35% |
| Glycerol | 2% | 4% | 6% | 8% |
| Rapeseed oil | 4% | 4% | 4% | 0% |
| Trisodium citrate[3] | 0.87% | 0.87% | 0.87% | 0.87% |
| Disodium phosphate[3] | 0.4% | 0.4% | 0.4% | 0.4% |
| Water | 51.0% | 51.0% | 51.0% | 51.0% |
| Citric acid[4] | 0.5% | 0.5% | 0.5% | 0.5% |
| Sorbic acid[5] | 0.08% | 0.08% | 0.08% | 0.08% |
| Sodium Chloride[6] | 1.37% | 1.37% | 1.37% | 1.37% |

[1]Kerry Ingredients, Listowel, Ireland;
[2]National Starch and Chemicals, Manchester, England;
[3]Ellis and Everard, Dublin, Ireland;
[4]Jungbunzlauer, Pernhofen, Austria;
[5]Hoechst Ireland Limited, Dublin, Ireland;
[6]Salt Union, Cheshire, England.

Heat-expandable precursors according to examples 9-12 were prepared according to the procedure described above in relation to the preparation of example 2, but including the respective weight % of the sugar alcohol glycerol (2% in example 9, 4% in example 10, 6% in example 11 and 8% in example 12), instead of the sugar alcohol sorbitol used in example 2.

EXAMPLES 13-15

Heat-expandable precursors according to the invention were prepared from the ingredients listed in Table 5:

TABLE 5

| INGREDIENTS | Ex. 13 | Ex. 14 | Ex. 15 |
|---|---|---|---|
| Rennet casein[1] (80% protein) | 24.42% | 24.42% | 24.42% |
| Hi-Maize 260[2] (Trade Mark) | 15.35% | 13.35% | 11.35% |
| Xylitol | 2% | 4% | 6% |
| Rapeseed oil | 4% | 4% | 4% |
| Trisodium citrate[3] | 0.87% | 0.87% | 0.87% |
| Disodium phosphate[3] | 0.4% | 0.4% | 0.4% |
| Water | 51.0% | 51.0% | 51.0% |
| Citric acid[4] | 0.5% | 0.5% | 0.5% |
| Sorbic acid[5] | 0.08% | 0.08% | 0.08% |
| Sodium Chloride[6] | 1.37% | 1.37% | 1.37% |

[1]Kerry Ingredients, Listowel, Ireland;
[2]National Starch and Chemicals, Manchester, England;
[3]Ellis and Everard, Dublin, Ireland;
[4]Jungbunzlauer, Pernhofen, Austria;
[5]Hoechst Ireland Limited, Dublin, Ireland;
[6]Salt Union, Cheshire, England.

Heat-expandable precursors according to examples 13-15 were prepared according to the procedure described above in relation to the preparation of example 2, but including the respective weight % of the sugar alcohol xylitol (2% in example 13, 4% in example 14 and 6% in example 15), instead of the sugar alcohol sorbitol used in example 2.

EXAMPLE 16

Heat-expanded products according to the invention were prepared as described in example 8, using sample pieces of precursor from examples 9-15.

The heat-expanded synthetic cheese products were analysed for moisture content, fat content, protein content, glycerol/xylitol content, and carbohydrate content as set out in (i)-(iii) of example 8, and the results are given in Table 6 below:

TABLE 6

| | Added Glycerol/Xylitol (%) | Glycerol/Xylitol Analysis (%) | Fat Content (%) | Moisture Content (%) | Protein Content (%) | Ash (%) | Carbohydrate (%) |
|---|---|---|---|---|---|---|---|
| Example 9 | 2 | 4.1 | 8.4 | 10.2 | 37.8 | 8.2 | 31.3 |
| Example 10 | 4 | 8.3 | 8.2 | 9.6 | 38.0 | 8.5 | 27.4 |
| Example 11 | 6 | 12.5 | 8.3 | 10.7 | 39.5 | 8.4 | 20.6 |
| Example 12 | 8 | 16.8 | 8.0 | 13.0 | 37.5 | 7.8 | 16.9 |
| Example 13 | 2 | 4.2 | 8.3 | 10.6 | 37.6 | 8.2 | 31.1 |
| Example 14 | 4 | 8.2 | 8.4 | 10.0 | 37.8 | 8.4 | 27.2 |
| Example 15 | 6 | 12.9 | 8.6 | 9.5 | 39.0 | 8.6 | 21.4 |

The heat-expanded synthetic cheese products originating from examples 9-15 were analysed for expansion, after resting for 1 day. The degree of expansion (volume expansion %) of the synthetic cheese products was determined for each of the products using the formula given above, and the results are given in Table 7 below.

The hardness of the synthetic cheese products was also determined for the products containing 2%, 4%, 6% and 8% glycerol, using the process described above in example 8, and the results, given as hardness values in Newtons (N), are given in Table 7 below.

TABLE 7

| | Glycerol/xylitol added (%) | Expansion % day + 1 | Hardness (N) day + 1 |
|---|---|---|---|
| Example 9 | 2 | 338 | 16.07 ± 3.45 |
| Example 10 | 4 | 288.9 | 11.61 ± 4.20 |
| Example 11 | 6 | 186 | 13.75 ± 6.87 |
| Example 12 | 8 | 176 | 11.26 ± 4.19 |
| Example 13 | 2 | 310 | Not tested |
| Example 14 | 4 | 274 | Not tested |
| Example 15 | 6 | 169 | Not tested |

For each batch, 10 samples were measured, and the averages taken.

The heat-expanded synthetic cheese products according to the invention exhibited excellent organoleptic properties, including very good overall texture and taste, excellent crispiness and the absence of sogginess or brittleness.

In terms of texture and taste, the heat-expanded synthetic cheese products had a pleasing crispy, puffed texture and appearance; and an improved taste compared with the product containing no sugar alcohol (example 1) or no fat (example 7).

In terms of crispiness, current commercially available crispy snack foods have hardness values in the region of from about 5 N to about 25 N. The heat-expanded synthetic cheese products had an excellent quality of crispness, having hardness values of from about 5 N to about 22 N (see Tables 3A and 7). In contrast, the comparative example (example 1) demonstrates that the absence of a sugar alcohol produces a product which has an exceedingly high hardness value of about 41 N after 1 day, and nearly 30 N after 4 days, thereby indicating a hard, brittle product which is unappealing to consumers.

In terms of volume expansion %, the heat-expanded synthetic cheese products of the invention advantageously exhibited good volume expansion % averaging in the region of 300%, which provides an optimum crispiness and texture.

Unlike the heat-expanded products of the invention, the comparative product of example 1 having no sugar alcohol exhibited very limited expansion, peaking at only 142% after 7 days of resting, which is undesirable.

In summary, the heat-expanded synthetic cheese products of the invention of the present invention are crispy, puffed food products which are superior in terms of texture, taste and volume expansion, compared with conventional products. Additionally, the heat-expandable precursors of the invention are tasty, edible snacks which are superior in terms of texture, taste and volume expansion, compared with conventional precursors.

The invention claimed is:

1. A heat-expanded synthetic cheese product, consisting essentially of:
   from about 20% to about 59% by weight of a milk protein or a source thereof;
   from about 10% to about 50% by weight of a starch, said starch consisting of a resistant starch;
   from about 2% to about 24% by weight of a sugar alcohol;
   from about 3% to about 15% by weight of water;
wherein the heat-expanded synthetic cheese product comprises no more than 10% by weight of fat,
the percentages being percentages by weight of the total product,
and wherein the heat-expanded synthetic cheese product has a volume expansion % of from about 150% to about 600% and is a microwave-expanded synthetic cheese product or a radiofrequency (RF)-expanded synthetic cheese product.

2. A heat-expanded synthetic cheese product according to claim 1, wherein the milk protein or source thereof is selected from casein, total milk proteins, milk protein concentrates or isolates, skim milk curd and other casein whey combinations.

3. A heat-expanded synthetic cheese product according to claim 2, wherein the milk protein is rennet casein.

4. A heat-expanded synthetic cheese product according to claim 1, wherein the milk protein or source thereof is present in an amount of from about 25% to about 55% by weight of the heat-expanded synthetic cheese product.

5. A heat-expanded synthetic cheese product according to claim 1, wherein the starch is derived from a cereal selected from corn and maize, or rice, or is derived from tubers or a combination thereof.

6. A heat-expanded synthetic cheese product according to claim 1, wherein the starch is in a native granular form.

7. A heat-expanded synthetic cheese product according to claim 1, wherein the starch is a high amylose starch.

8. A heat-expanded synthetic cheese product according to claim 1, wherein the starch is corn starch.

9. A heat-expanded synthetic cheese product according to claim 1, wherein the starch is present in an amount of from about 12% to about 45%, by weight of the synthetic cheese product.

10. A heat-expanded synthetic cheese product according to claim 1, wherein the sugar alcohol is selected from sorbitol, xylitol, mannitol and glycerol or any combination thereof.

11. A heat-expanded synthetic cheese product according to claim 1, wherein the sugar alcohol is present in an amount of from about 3% to about 22%, by weight of the heat-expanded synthetic cheese product.

12. A heat-expanded synthetic cheese product according to claim 1, wherein the sugar alcohol comprises sorbitol, xylitol or glycerol, or any combination thereof, in an amount of from about 5% to about 13%, by weight of the heat-expanded synthetic cheese product.

13. A heat-expanded synthetic cheese product according to claim 1, wherein the water is present in an amount of from about 5% to about 13%, by weight of the heat-expanded synthetic cheese product.

14. A heat-expanded synthetic cheese product according to claim 1, wherein the fat is selected from one or more of the following: edible marine oils and fats, edible animal oils and fats, and edible vegetable oils and fats, optionally modified by fractionation and/or hydrogenation and/or inter-esterification.

15. A heat-expanded synthetic cheese product according to claim 1, wherein the fat is selected from palm oil, rapeseed oil, soy bean oil, palm kernel oil, sunflower oil, coconut oil, cotton seed oil, canola oil and safflower oil, tallow, lard, fish and mixtures thereof.

16. A heat-expanded synthetic cheese product according to claim 15, wherein the fat is rapeseed oil.

17. A heat-expanded synthetic cheese product according to claim 1, wherein the fat is present in an amount of from about 1% to about 9% by weight of the product.

18. A heat-expanded synthetic cheese product according to claim 1, wherein the heat-expanded synthetic cheese product of the invention includes one or more conventional additives selected from the following: emulsifying agents, acidity regulators, preservatives, flavouring agents, and colouring agents.

19. A heat-expanded synthetic cheese product according to claim 1, having a hardness value of from about 5 N to about 22 N.

20. A heat-expanded synthetic cheese product according to claim 1, having a volume expansion % of from about 200% to about 500%.

21. An edible heat-expandable precursor for forming the heat-expanded synthetic cheese product according to claim 1, the heat-expandable precursor consisting essentially of:
   from about 12% to about 26% by weight of a milk protein or a source thereof;
   from about 3% to about 30% by weight of a starch, said starch consisting of a resistant starch;
   from about 1% to about 10% by weight of a sugar alcohol;
   from about 46% to about 60% by weight of water;
wherein the precursor comprises no more than 6% by weight of fat,
the percentages being percentages by weight of the precursor, and wherein the heat-expandable precursor is a microwave-expandable precursor or a radiofrequency (RF)-expandable precursor, which is capable of achieving a volume expansion % of from about 150% to about 600%.

22. An edible heat-expandable precursor according to claim 21, wherein the milk protein or source thereof is selected from casein, total milk proteins, milk protein concentrates or isolates, skim milk curd and other casein whey combinations, wherein the milk protein is present in an amount of from about 15% to about 25% by weight of the precursor.

23. An edible heat-expandable precursor according to claim 21, wherein the starch is derived from a cereal selected from corn and maize, or rice, or is derived from tubers or a combination thereof, wherein the starch is present in an amount of from about 5% to about 25% by weight of the precursor.

24. An edible heat-expandable precursor according to claim 21, wherein the sugar alcohol is selected from sorbitol, xylitol, mannitol and glycerol or any combination thereof, wherein the sugar alcohol is present in an amount of from about 2% to about 9%, by weight of the precursor.

25. An edible heat-expandable precursor according to claim 21, wherein the fat is selected from one or more of the following: edible marine oils and fats, edible animal oils and fats, and edible vegetable oils and fats, optionally modified by fractionation and/or hydrogenation and/or inter-esterification, wherein the fat is preferably present in an amount of no more than 5% by weight of the precursor.

26. An edible heat-expandable precursor according to claim 21, wherein the water is present in an amount of from about 48% to about 55% by weight of the precursor.

27. An edible heat-expandable precursor according to claim 21, wherein the precursor includes one or more conventional additives selected from emulsifying agents, acidity regulators, preservatives, flavouring agents, and colouring agents.

28. An edible heat-expandable precursor according to claim 21, wherein the precursor is capable of achieving a volume expansion % of from about 200% to about 500%.

29. A method for preparing the heat-expandable precursor according to claim 21, comprising the steps of:
 (a) combining the milk protein, water and fat at a temperature of from about 30° C. to about 90° C.; and
 (b) adding the starch and the sugar alcohol to the resulting mixture.

30. A method according to claim 29, wherein step (a) comprises combining the ingredients at a temperature of from about 30° C. to about 70° C., followed by heating the combined ingredients to a temperature of from about 70° C. to about 90° C.

31. A method according to claim 30, wherein following step (b), the heat-expandable precursor is allowed to cool to a temperature of from about 1° C. to about 6° C.

32. A method for preparing a heat-expanded synthetic cheese product consisting essentially of:
 from about 20% to about 59% by weight of a milk protein or a source thereof;
 from about 10% to about 50% by weight of a starch, said starch consisting of a resistant starch;
 from about 2% to about 24% by weight of a sugar alcohol;
 from about 3% to about 15% by weight of water;
wherein the heat-expanded synthetic cheese product comprises no more than 10% by weight of fat, the percentages being percentages by weight of the total product,
and wherein the heat-expanded synthetic cheese product has a volume expansion % of from about 150% to about 600% and is a microwave-expanded synthetic cheese product or a radiofrequency (RF)-expanded synthetic cheese product, comprising the steps of the method according to claim 29 and further comprising the step of:
 (c) subjecting the heat-expandable precursor to microwave or radiofrequency (RF) heat until the heat-expandable precursor has expanded.

33. A method according to claim 32, wherein, prior to step (c), the precursor is allowed to rest for a period of from about 12 hours to about 14 days.

34. A method according to claim 32, wherein the precursor is allowed to rest at a temperature of from about 1° C. to about 6° C.

35. A method according to claim 32, wherein the precursor is heated by microwave or RF heat until the precursor achieves a volume expansion % of from about 200% to about 500%.

36. A method according to claim 32, wherein the precursor is subjected to microwave or RF heat for a period of from about 10 to 100 seconds in a microwave set at 500-1500 W.

\* \* \* \* \*